US008181922B2

(12) United States Patent
Dennison

(10) Patent No.: US 8,181,922 B2
(45) Date of Patent: May 22, 2012

(54) AMPLIFIER AFFIXED BRACKET SECURING DEVICE

(76) Inventor: Lance Reegan-Diehl Dennison, Seoul (KR)

( * ) Notice: Subject to any disclaimer, the term of this patent is extended or adjusted under 35 U.S.C. 154(b) by 105 days.

(21) Appl. No.: 12/763,393

(22) Filed: Apr. 20, 2010

(65) Prior Publication Data

US 2011/0155877 A1    Jun. 30, 2011

Related U.S. Application Data

(60) Provisional application No. 61/284,851, filed on Dec. 28, 2009.

(51) Int. Cl.
*A45D 19/04* (2006.01)

(52) U.S. Cl. ........... 248/175; 248/302; 248/176.1

(58) Field of Classification Search ........... 248/914, 248/175, 176.1, 95, 99, 100, 689, 302, 229.26, 248/229.16, 228.7, 230.7, 231.81, 309.1, 248/316.7; 84/327, 329, 453
See application file for complete search history.

(56) References Cited

U.S. PATENT DOCUMENTS

| | | | | | |
|---|---|---|---|---|---|
| 418,420 | A | * | 12/1889 | North et al. | 248/229.26 |
| 926,798 | A | * | 7/1909 | Wilson | 248/231.81 |
| 1,858,836 | A | * | 5/1932 | Martell | 52/647 |
| 2,216,876 | A | * | 10/1940 | Crum | 248/74.2 |
| 2,253,847 | A | * | 8/1941 | Crum | 248/231.81 |
| 2,350,600 | A | * | 6/1944 | Foster | 362/225 |
| 2,461,374 | A | * | 2/1949 | Custer | 248/146 |
| 2,658,116 | A | * | 11/1953 | Skantze | 379/447 |
| 3,220,434 | A | * | 11/1965 | Young et al. | 137/374 |
| 3,532,225 | A | * | 10/1970 | Reed | 211/181.1 |
| 3,765,633 | A | * | 10/1973 | Caudill | 248/229.12 |
| 4,775,124 | A | * | 10/1988 | Hicks | 248/175 |
| 4,991,809 | A | * | 2/1991 | Harkey | 248/229.12 |
| 5,016,847 | A | * | 5/1991 | Herzig | 248/175 |
| 5,042,761 | A | * | 8/1991 | McBride et al. | 248/175 |
| 5,313,866 | A | * | 5/1994 | Smith | 84/327 |
| 5,556,068 | A | * | 9/1996 | Gorelik | 248/220.41 |
| 6,045,107 | A | * | 4/2000 | Carlson | 248/445 |
| 7,131,615 | B1 | * | 11/2006 | Bruce | 248/127 |
| 7,446,249 | B2 | * | 11/2008 | Driscoll | 84/327 |
| 2006/0175488 | A1 | * | 8/2006 | Schmiddem et al. | 248/213.2 |

* cited by examiner

*Primary Examiner* — Nkeisha Smith
(74) *Attorney, Agent, or Firm* — Bay Area Technology Law Group PC

(57) ABSTRACT

A bracket device for removably securing a control box atop a portable amplifier. The portable amplifier is provided with a handle secured to its top by spaced apart securing hardware. The device is in the form of a resilient construct having a U-shaped top portion, a pair of bridging members emanating from the U-shaped top portion and a pair of extension members extending substantially perpendicularly from the bridging members and having free distal ends. The extension members are spaced apart from one another approximately the distance between the spaced apart securing hardware and is sufficiently resilient to enable the extension members to be drawn together a sufficient distance to enable its free distal ends to pass between the securing hardware and beneath the handle and to exert lateral pressure against the securing hardware to resist inadvertent removal of the bracket from the top of the amplifier.

10 Claims, 2 Drawing Sheets

AMPLIFIER AFFIXED BRACKET SECURING DEVICE

RELATED APPLICATIONS

This application relies on provisional application Ser. No. 61/284,851 filed on Dec. 28, 2009.

TECHNICAL FIELD

The present invention involves a bracket which is remarkable in its simplicity and yet provides a way to removably secure devices to amplifier housings which are traditionally employed with portable amplification. In employing the present invention, a device, such as a control box, remains atop the amplifier secured from inadvertent abuse but which is readily removable therefrom without need for tools or other elaborate securing means.

BACKGROUND OF THE INVENTION

Those in the entertainment industry and particularly professional musicians, routinely employ portable amplifiers. For example, a performing guitarist performing would oftentimes carry his guitar, music stand and amplifier on stage; equipment which is then removed once his performance has been completed to enable another musician to take the stage to perform as well.

Amplifiers used by professional entertainers are oftentimes of a common configuration. Such a device is depicted in the figures which constitute the present invention. For example, in FIG. 1A, amplifier 11 is shown having front 15, back 16, bottom 12, right side 13, left side 14 and top 17. For portability, a handle is applied to top 17 of amplifier 11 in the form of spaced apart securing hardware 18 and 19 and handle 20 sized to enable a user to grip handle 20 with one hand wrapping one's fingers about handle 20 in order to move amplifier 11 as needed.

Performers, and particularly musicians, oftentimes employ associated equipment with amplifier 11 for a number of purposes. In the example shown in FIG. 1A, control box 21 in the form of a 1U signal processor is depicted. The signal processor shown is a rectangular unit measuring 1¾"×19"×10" which is usually a rack mounted unit employed to tailor the amplifier signal in order to achieve the acoustic effect sought by the musician. Controllers 21 are so commonly used that it is assumed that whenever a musician is employing amplifier 11, that control box 21 would be routinely associated therewith.

On a crowded stage oftentimes having multiple performers who can move about during their performance, situating control box 21 appropriately can prove challenging. Wires must be connected between control box 21 and amplifier 11 and the challenge remains as to where to put the control box such that it will not represent a hazard to the performer nor be damaged by the performer inadvertently kicking or stepping upon it when in use. If one was to simply place control box 21 on top 17 of amplifier 11, it could easily fall to the ground when it or the amplifier is inadvertently bumped or nudged. Not only would this prove costly in the event that the control box was damaged but could also significantly interfere with the musician's performance as the effects created by control box 21 would be temporarily or permanently disrupted.

It is thus an object of the present invention to provide a simple yet effective way to removably secure a device such as a control box atop an amplifier to prevent its inadvertent dislodgement.

It is yet a further object of the present invention to provide a simple bracket which can be employed with existing amplifiers and which prevent damage to or interference with a device such as a control box when used during a musical or other performance.

These and further objects will be more readily apparent when considering the following disclosure and appended claims.

SUMMARY OF THE INVENTION

A bracket device for removably securing a device such as a control box atop a portable amplifier, said portable amplifier having a front, back, sides and a top, a handle secured to said top by spaced apart securing hardware, said handle being of a length to enable a user to grasp it between said securing hardware, said bracket device comprising a resilient construct having a U-shaped top portion, a pair of bridging members emanating from said U-shaped top portion and a pair of extension members extending substantially perpendicularly from said bridging members and having free distal ends, said extension members being spaced from one another approximately the distance between said spaced apart securing hardware, said bracket device being sufficiently resilient to enable said extension members to be drawn together a sufficient distance to enable said free distal ends to pass between said securing hardware and beneath said handle and to exert lateral pressure against said securing hardware to resist inadvertent removal of said bracket device from atop said amplifier.

DETAILED DESCRIPTION OF THE INVENTION

Figure 1A:
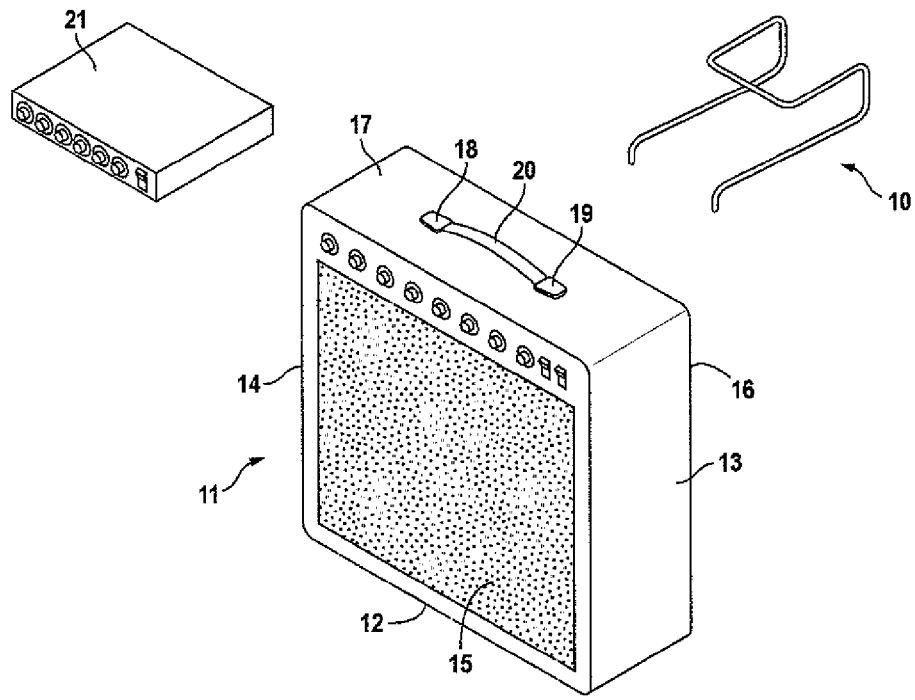
FIG. 1A is a expanded perspective view of an embodiment to the present invention shown in conjunction with a standard amplifier and signal processor.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto.

Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

Figure 1B:
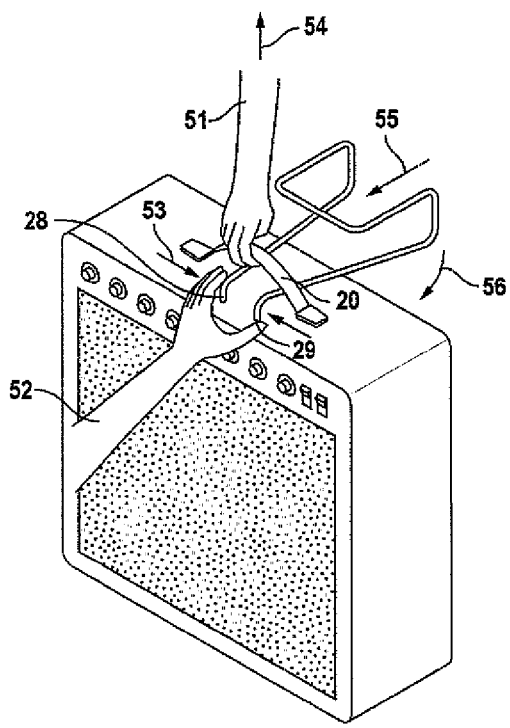
FIGS. 1B and 1C are perspective views of a suggested way of removably attaching the bracket device of the present invention to a standard amplifier.
Figure 1C:
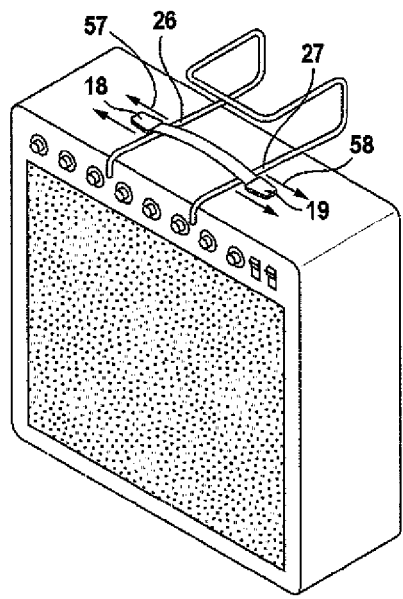
Figure 3A:
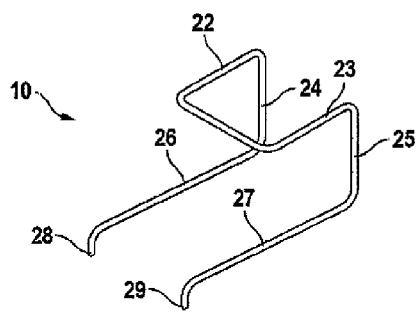
FIGS. 3A and 3B are perspective views of two versions of the bracket device of the present invention.

Turning first to FIG. 1A, amplifier 11 is depicted. Bracket device 10 is also shown and, referring to FIG. 3A, is composed of subparts, namely, U-shaped top portion 22, a pair of bridging members 24 and 25 emanating from said U-shaped top portion 22 and a pair of extension members 26 and 27 extending substantially perpendicularly from the bridging members 26 and 27 and having distal ends 28 and 29 which, in its preferred embodiment, are curved and sized to drape over top 17 of amplifier 11 as shown in FIG. 1C.

Bracket device 10 in its relaxed state (FIGS. 3A and 3B) is sized such that extension members 26 and 27 or 35 and 36 are spaced from one another approximately the distance between spaced apart securing hardware 18 and 19. However, as shown in FIG. 1B, the thumb and index finger of appendages 52 can cause distal ends 28 and 29 of extension members 26 and 27 to be drawn together enabling the bracket device to slip beneath handle 20 facilitated by lifting handle 20 in the direction of arrow 54 by appended 51. Having done so, because of the elastic modulus of bracket device 10, extension members 26 and 27 spring back in an attempt to regain their at rest spacing and, in doing so, abut against spaced apart hardware 18 and 19 placing pressure thereon in the direction of arrows 57 and 58. With this frictional pressure placed upon the securing hardware, together with the securing of handle 20 and the overlapping lip established by the curved portion at the extremity of extension members 26 and 27 at 28 and 29, bracket device 10 cannot inadvertently be dislodged from its joined position as best seen in reference to FIG. 1C.

Figure 2:
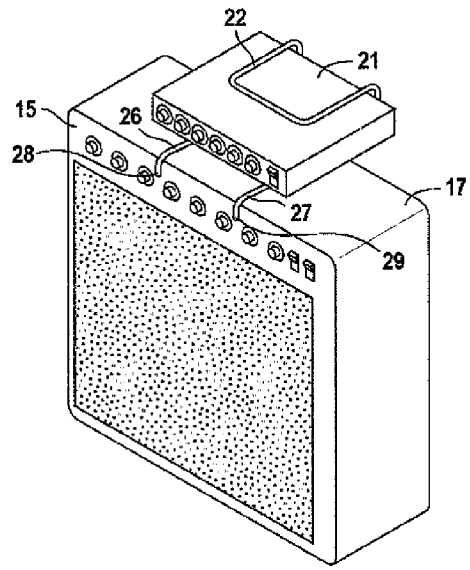
FIG. 2 is a perspective view of the present invention in use after having carried out the application steps of FIGS. 1B and 1C.

Once bracket device 10 has been joined to amplifier 11, an auxiliary device, such as control box 21, can be inserted as shown in FIG. 2. In that controllers, such as that depicted herein are intended to be rack mounted and are thus of a generally standard dimension, a suitable spacing can be established between U-shaped top portion 22 and extension members 26 and 27 to create a snug frictional fit between these elements. As such, even if amplifier 11 was to be inadvertently bumped to the point where base 12 was no longer residing on a supporting surface, control box 21 would remain as shown in FIG. 2. Thus, damage to control box 21 which would otherwise be experienced by simply laying it about a performing stage or loosely atop an amplifier would be completely avoided. In addition, the look of the performing presentation would be much neater and more professionally staged by securely affixing the control box above or proximate to the amplifier to which it is to be interfaced.

Figure 3B:
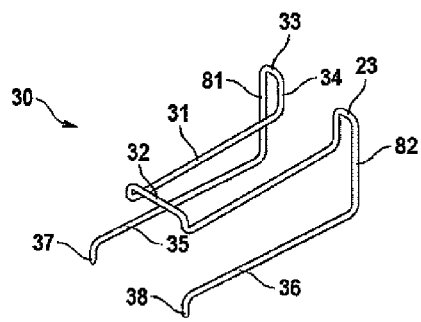
Figure 4:
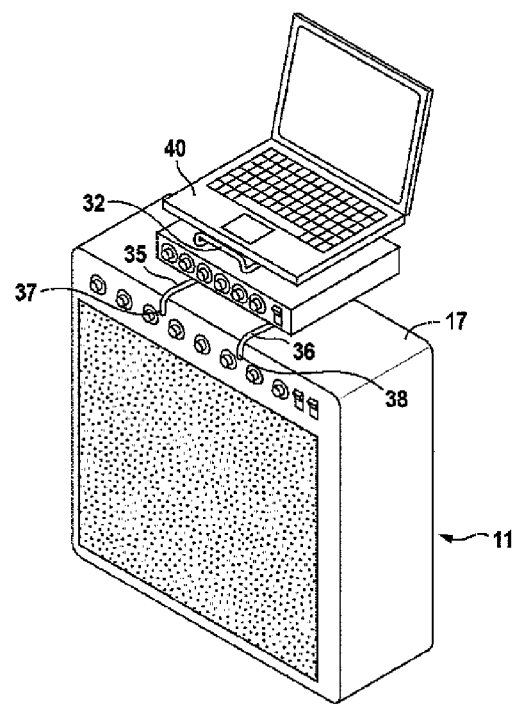
FIG. 4 is a perspective view showing the bracket device of FIG. 3B in use atop a standard amplifier for supporting multiple devices thereupon.

In turning to FIG. 3B, a further iteration of the present invention is presented. In this instance, bridging members 81 and 82 are elongated creating lip 34 adjacent thereto. At the extreme end of U-shaped top portion 31 is lip segment 32 resulting in the creation of a trough. This trough can be employed to support auxiliary equipment shown, for example, in FIG. 4 as computer 40. In using the embodiment of FIG. 3B, the remaining elements operate as described with reference to the embodiment of FIG. 3A including extension members 35 and 36 with lips at distal ends 37 and 38 residing atop amplifier 11.

Although bracket devices 10 and 30 can be composed of any materials providing a construct which forms the functions outlined above, it has been found that ideally suited for this purpose are 5 mm stainless steel wire or 8 mm poly tube or suitable wire which has been coated with liquid PVC or powder coated and finished off by applying two rubberized end pieces to cover distal ends 28/29 and 37/38. Ideally, the constructs can be created by bending steel wire into shape from a 110 cm piece pre-coated with PVC. In addition to dipping, PVC tubing can be heated and slipped over the stainless steel wire stock to complete the device.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like.

Therefore, the above description and illustration should not be considered as limiting the scope of the invention, which is defined by the appended claims.

What is claimed is:

1. A bracket device securing a device atop a portable amplifier and said portable amplifier receiving said bracket device, said portable amplifier having a front, back, sides and a top, a handle secured to said top by spaced apart securing hardware, said handle being of a length to enable a user to grasp it between said securing hardware, said bracket device comprising a resilient construct having a U-shaped top portion, a pair of bridging members emanating from said U-shaped top portion and a pair of extension members extending substantially perpendicularly from said bridging members and having free distal ends, said extension members being spaced from one another approximately a distance between said spaced apart securing hardware, said bracket device being sufficiently resilient to enable said extension members to be drawn together a sufficient distance to enable said free distal ends to pass between said securing hardware and beneath said handle and to exert lateral pressure against said securing hardware to resist inadvertent removal of said bracket device from atop said amplifier.

2. The bracket device of claim 1 wherein said distal ends of said extension members are provided with curved segment sized to drape over said top when said bracket device is positioned on said amplifier.

3. The bracket device of claim 1 wherein said bridging members are of a length to receive and to frictionally and removably secure said device between said U-shaped portion and said extension members.

4. The bracket device of claim 1 wherein said resilient construct comprises a length of wire.

5. The bracket device of claim 4 wherein said length of wire comprises 8 mm stainless wire.

6. The bracket device of claim 4 wherein said length of wire is coated with a layer of PVC.

7. The bracket device of claim 1 wherein said resilient construct comprises a length of poly tube.

8. The bracket device of claim 1 wherein said U-shaped portion further comprises lip segments for receiving hardware items atop said bracket device when positioned at the top of said amplifier.

9. A method for removably securing a device atop a portable amplifier, comprising the portable amplifier having a front, back, sides and top, a handle secured to said top by spaced apart securing hardware, said handle being of a length to enable a user to grasp it between said securing hardware, a bracket device comprising a resilient construct having a U-shaped top portion, a pair of bridging members emanating from said U-shaped top portion and a pair of extension members extending substantially perpendicularly from said bridging members and having free distal ends, said extension members being spaced from one another approximately a distance between said spaced apart securing hardware, said bracket device being sufficiently resilient to enable said extension members to be drawn together a sufficient distance to enable said free distal ends to pass between said securing hardware and beneath said handle and to exert lateral pressure against said securing hardware to resist inadvertent removal of said bracket device from atop said amplifier, comprising the steps of drawing together said extension members at their distal ends and said distal ends inserted atop said amplifier and beneath said handle to clear said securing hardware whereupon said distal ends are released causing them to separate from one another at their distal ends creating frictional pressure against said securing hardware whereupon said device is inserted between said U-shaped top portion and pair of extension members.

10. The method of claim 9 wherein said distal ends of said extension members are provided with curved segments sized to drape over said top when said bracket device is positioned on said amplifier, said extension members being inserted beneath said handle a sufficient distance to enable said curved segments to extend over said top against the front of said amplifier.

* * * * *